United States Patent [19]

Cech

[11] Patent Number: 5,351,974
[45] Date of Patent: Oct. 4, 1994

[54] IN-LINE SKATE BRAKING ASSEMBLY AND METHOD

[76] Inventor: Donald E. Cech, 1736 Collyer St., Longmont, Colo. 80501

[21] Appl. No.: 950,082

[22] Filed: Sep. 23, 1992

Related U.S. Application Data

[63] Continuation-in-part of Ser. No. 753,318, Aug. 30, 1991, Pat. No. 5,226,673, which is a continuation-in-part of Ser. No. 608,849, Nov. 5, 1990, abandoned.

[51] Int. Cl.⁵ ............................................. A63C 17/14
[52] U.S. Cl. .................................. 280/11.2; 188/2 D; 188/17; 188/77 R; 188/264 R; 188/250 H; 280/11.22
[58] Field of Search ................. 280/11.2, 11.19, 11.22, 280/11.23; 188/2 R, 2 D, 71.1, 72.7, 250 A, 336, 337–339, 250 H, 1.12, 264 A, 164 AA, 264 R, 64, 18 R, 17, 29, 71.6, 264 W, 77 R; 192/80, 75–78; 16/35 R

[56] References Cited

U.S. PATENT DOCUMENTS

| | | | |
|---|---|---|---|
| 795,144 | 7/1905 | Longenecker | 188/17 |
| 982,846 | 1/1911 | Nesbitt, Sr. | |
| 1,111,647 | 9/1914 | Dahms | 188/17 |
| 1,548,631 | 8/1925 | Robertson | |
| 1,882,173 | 6/1932 | Blake | |
| 1,925,233 | 11/1932 | Cremer | |
| 1,928,743 | 12/1932 | Sneed | |
| 2,139,699 | 10/1938 | Segal | |
| 2,140,955 | 12/1938 | Goettie | |
| 2,570,349 | 10/1951 | Kardhordo | |
| 3,823,952 | 7/1974 | Kukulowicz | 280/11.22 X |
| 3,871,672 | 3/1975 | Bardy | |
| 3,900,203 | 8/1975 | Kukulowicz | 280/11.22 X |
| 3,904,215 | 9/1975 | Bardy | |
| 4,076,266 | 2/1978 | Krausz | |
| 4,094,524 | 6/1978 | Carroll | |
| 4,134,599 | 1/1979 | DiMille et al. | 188/29 |
| 4,183,546 | 1/1980 | Heilig | |
| 4,273,345 | 6/1981 | Ben-Dor et al. | 280/11.2 |
| 4,275,895 | 6/1981 | Edwards | 280/11.2 |
| 4,295,547 | 10/1981 | Dungan | |
| 4,300,781 | 11/1981 | Riggs | |
| 4,503,944 | 3/1985 | Burckhardt et al. | 188/71.6 |
| 4,633,979 | 1/1987 | Edwards | |
| 4,641,731 | 2/1987 | Kawaguchi et al. | 188/71.6 |
| 4,691,931 | 9/1987 | Vincent | |
| 4,706,974 | 11/1987 | Vincent | |
| 4,805,936 | 2/1989 | Krantz | 280/11.2 X |
| 4,943,075 | 7/1990 | Gates | |
| 5,088,748 | 2/1992 | Koselka et al. | 188/29 |
| 5,171,032 | 12/1992 | Dettmer | 280/11.2 |
| 5,178,235 | 1/1993 | Montalvo III et al. | 188/18 A |
| 5,226,673 | 7/1993 | Cech | 188/2 D |
| 5,246,093 | 9/1993 | Wang | 188/196 V X |

FOREIGN PATENT DOCUMENTS

379906 1/1990 European Pat. Off.
143245 11/1902 Fed. Rep. of Germany.

*Primary Examiner*—Douglas C. Butler
*Attorney, Agent, or Firm*—Harold A. Burdick

[57] ABSTRACT

A braking assembly and method are disclosed for use with in-line skates, the assembly including a brake pad or pads movably mounted to the skate and positioned adjacent to a selected wheel or wheels of the skate for selectively contacting a structure connected with the hub of the selected wheel or wheels. An actuator is operatively associated with the brake pad for selectively causing the pad to contact the structure.

19 Claims, 7 Drawing Sheets

Fig_5

Fig_6

Fig_7

*Fig_13*

*Fig_14*

Fig_15

IN-LINE SKATE BRAKING ASSEMBLY AND METHOD

RELATED APPLICATION

This application is a continuation-in-part of U.S. patent application Ser. No. 753,318 filed Aug. 30, 1991 and entitled "BRAKING ASSEMBLY AND METHOD", now U.S. Pat. No. 5,226,673 issued Jul. 13, 1993, which was a continuation-in-part of then pending U.S. patent application Ser. No. 608,849 filed Nov. 5, 1990, entitled "BRAKING ASSEMBLY AND METHOD", now abandoned.

FIELD OF THE INVENTION

This invention relates to braking assemblies, and, more particularly, relates to braking assemblies for in-line skates.

BACKGROUND OF THE INVENTION

Braking systems for utilization with skate-type wheels and/or castors have been heretofore known and/or utilized (see for example U.S. Pat. Nos. 4,295,547, 4,076,266, 4,094,524, 4,134,599, 4,183,546, 4,300,781, 4,706,974, 4,691,931, 4,602,801, 2,140,955, 982,846, 4,275,895, 2,139,699, 2,707,794, 2,685,351, and 4,943,075). However, stopping speed and control have not always proven to be entirely satisfactory in some applications of such systems, and ease of application (where, for example, such system is to be retrofit in a particular application such as on an in-line skate) and/or ease of replacement of worn parts has not always been given due consideration. Additionally, many heretofore known systems are not particularly well adapted for use on in-line skates.

Skates having a linearly arranged set of wheels have also been heretofore known (see for example U.S. Pat. Nos. 3,823,952, 28,509, 2,570,349, 2,145,219, 480,610, and 2,048,916). As such "in-line" skates have gained in popularity and use, users have discovered that they are difficult to safely slow or stop. In-line skates in some cases employ a heel or toe piece of rubber material for slowing or stopping the skate when a user drags the piece on the skating surface. Use of such toe or heel pieces is difficult to master even for the experienced skater, and particularly so on uneven or heavily used skate paths. One arrangement has used an actuatable brake for such in-line skates, but this arrangement again requires a particular skate maneuver in order to activate the brake (see European Application Number 379,906-A). Braking systems particularly adapted for such wheeled skates having linearly arranged sets of wheels have thus not been heretofore entirely satisfactory.

SUMMARY OF THE INVENTION

This invention provides an improved braking assembly and method for application with in-line skates (i.e., skates having a single linearly arranged set of wheels including at least one middle wheel, the wheels each being rotatably connected by a separate axle with a support structure). The braking assembly includes a brake pad mountable with the structure supporting the skate wheels adjacent to the hub of a selected wheel, the hub of the selected wheel having a surface configured to be in proximity to the brake pad when the brake pad is mounted, and an actuator for causing movement of the brake pad so that the brake pad contacts the surface of the wheel hub.

The surface of the hub is defined by structure mounted in an annular bore in one face of the hub (for example, a brake drum structure). An insulating/heat dissipating mechanism may be mounted with the hub to cool both the braking surfaces and the wheel. The actuator is preferably manually activatable.

The assembly of this invention is compact in design, suitable for either retrofit applications or original equipment applications and improves stopping and/or slowing ability of the skater while preserving skate control. Assembly parts are readily accessible and thus worn parts may be easily replaced.

It is therefore an object of this invention to provide an improved braking assembly and method for utilization with in-line skates.

It is another object of this invention to provide a braking assembly and method wherein a brake pad engages a surface at a hub of a central part of a wheel or wheels of an in-line skate to effect braking.

It is yet another object of this invention to provide a braking assembly and method for utilization with wheeled skates having a single linearly arranged set of wheels which improves stopping speed and/or stability.

It is still another object of this invention to provide an improved braking assembly and method for utilization with in-line skates which is adaptable for either retrofitting to a skate or as original equipment thereon, and which is easy to maintain and repair.

It is still another object of this invention to provide a braking assembly for wheeled apparatus having a single linearly arranged set of wheels, the set of wheels including a middle wheel, each of said wheels having a hub and being rotatably connected by a separate axle with a support structure, the braking assembly comprising a brake pad mountable with the support structure adjacent to the hub of one of the wheels, the hub having a surface configured to be in proximity to the brake pad when the brake pad is mounted, and an actuator operatively associated with the brake pad for selectively causing movement of the brake pad so that the brake pad contacts the surface of the hub.

It is still another object of this invention to provide a braking assembly for an in-line skate that includes a mechanism for insulation/heat dissipation.

It is yet another object of this invention to provide a braking assembly for an in-line skate having a single linearly arranged set of wheels, the set of wheels including a middle wheel, each of the wheels having a hub and being rotatably connected by a separate axle with a support structure, the braking assembly including a brake pad unit mountable to the support structure adjacent to the hub of at least one of the wheels, the hub having an annular bore at a face thereof, pad contacting structure mounted in the bore so that a surface of the pad contacting structure is in proximity to the brake pad unit when the brake pad unit is mounted, and an actuator operatively associated with the brake pad unit for selectively causing movement of the brake pad unit so that it contacts the surface of the pad contacting structure.

It is still another object of this invention to provide an in-line skate having a support structure, a single linearly arranged set of wheels including a middle wheel, each wheel having a hub and being rotatably connected by a separate axle with the support structure, a movable mount securable adjacent to the support structure, a brake pad mounted with the mount and movable therewith, a pad contacting structure connected to one of the hubs of the wheels, and an actuator operatively associated with the mount for selectively causing the brake pad to contact the pad contacting structure.

It is yet another object of this invention to provide a method for providing braking of an in-line skate having a single linearly arranged set of wheels including a middle wheel, each wheel having a hub and being connected by a separate axle with a support structure, the method including the steps of movably maintaining a brake pad adjacent to the support structure, mounting a pad contacting structure to the hub of one of the wheels, and operatively associating an actuator with the brake pad for selectively causing contact between the brake pad and the pad contacting structure.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figures 1, 2, 3, 4:
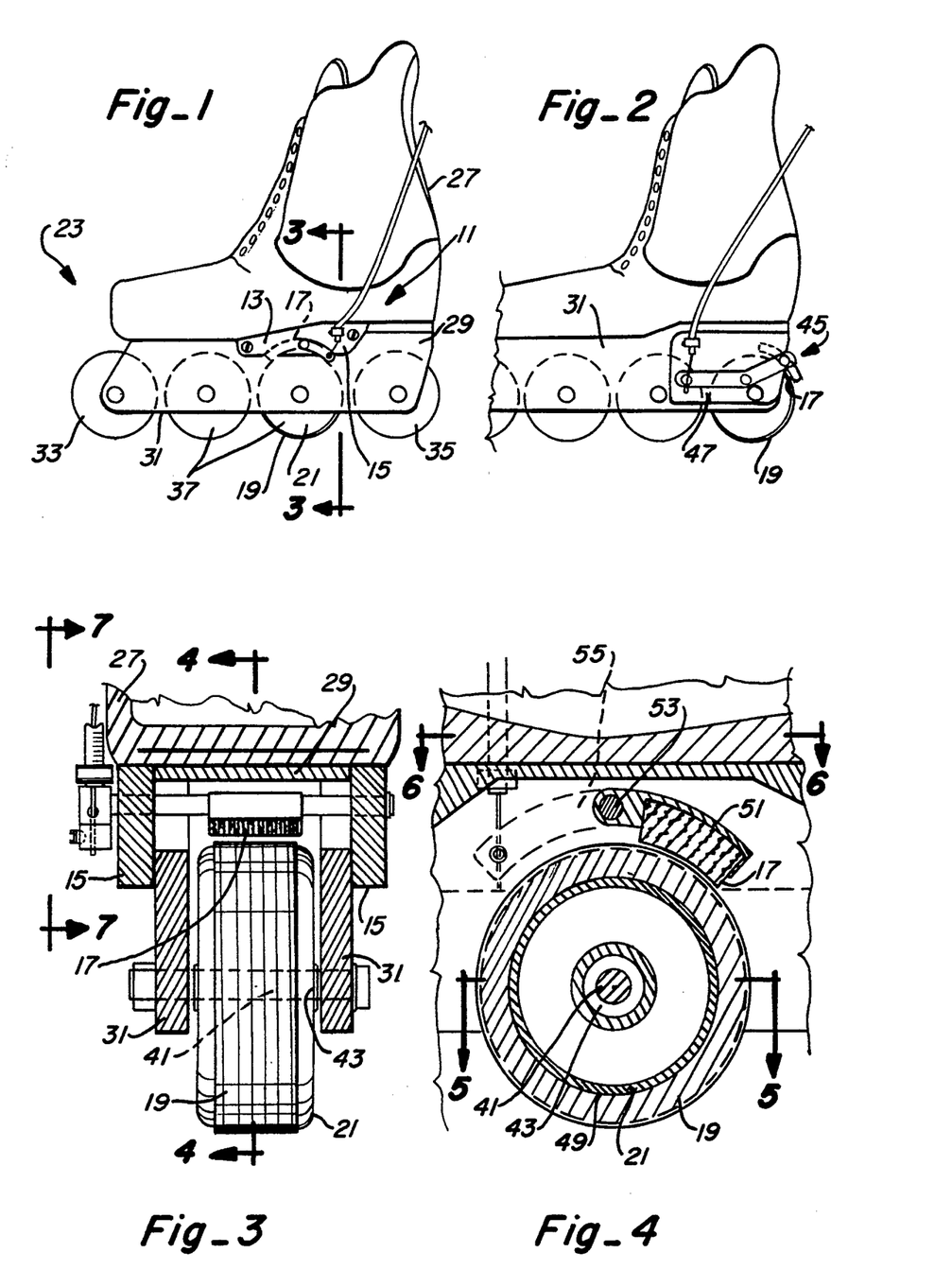
FIG. 1 is a side view of a first embodiment of the braking assembly of this invention when utilized in conjunction with a skate having a single linearly arranged set of wheels.
FIG. 2 is a partial side view of the braking assembly as illustrated in FIG. 1 with mounting for activation of a different one of the plurality of wheels.
FIG. 3 is a sectional view taken through section lines 3—3 of FIG. 1.
FIG. 4 is a sectional view taken through section lines 4—4 of FIG. 3.

A first embodiment of the braking assembly of this invention for utilization with a skate having a single set of linearly arranged wheels (also known as an in-line skate and sometimes referred to by the trademark name "Rollerblades" of one manufacturer of such skates) is illustrated in FIG. 1. It should be understood that the braking assembly of this invention, while illustrated with a skate, is utilizable with any wheeled apparatus having a plurality of wheels formed of a relatively rigid material such as hard plastics, aluminum, wood, steel or the like (such as roller skates, skateboards, rolling pallets, benches, and other systems employing castors).

As illustrated in FIGS. 1 through 7, brake assembly 11 includes mounting assembly 13 having mounting plate 15, brake pad 17, relatively resilient material band 19 applied to selected wheel 21 of skate 23, and actuator 25.

The skate to which braking assembly 11 is applied typically includes an article of footwear (such as shoe, or boot, 27), connected with support structure 29 including a wheel framework 31 having forward wheel 33, rearward wheel 35 and one or more middle wheels 37 (including selected wheel 21) rotatably connected thereto.

Figure 5:
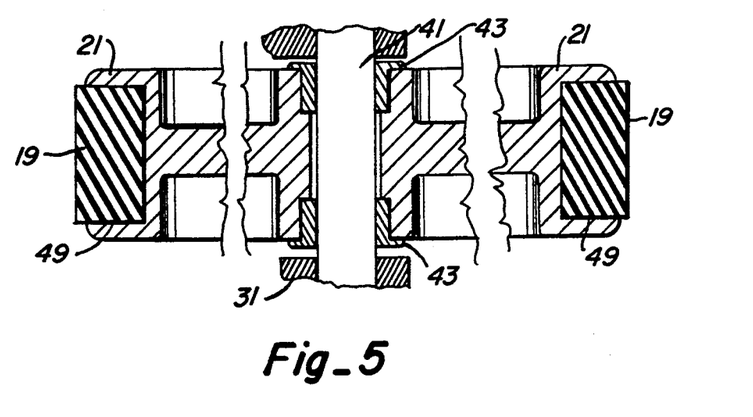
FIG. 5 is a sectional view taken through section lines 5—5 of FIG. 4.
Figure 6:
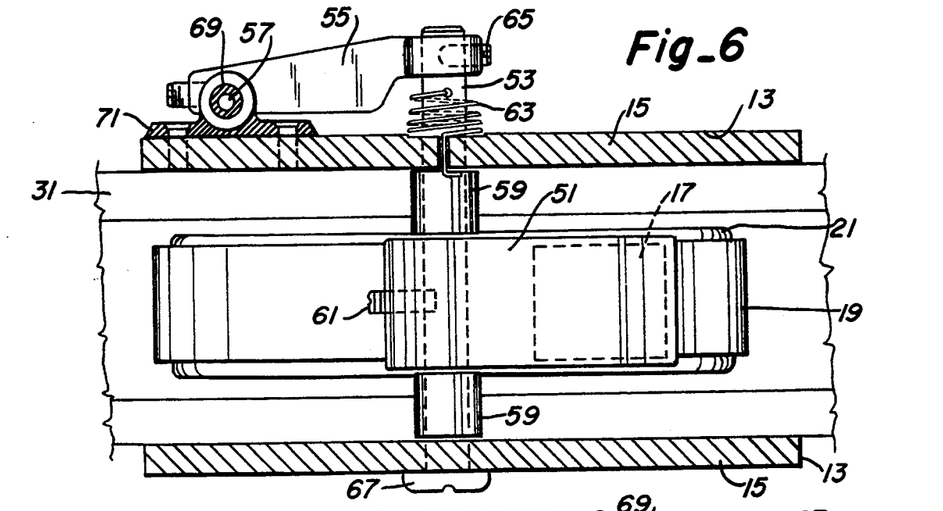
FIG. 6 is a sectional view taken through section lines 6—6 of FIG. 4.
Figure 7:
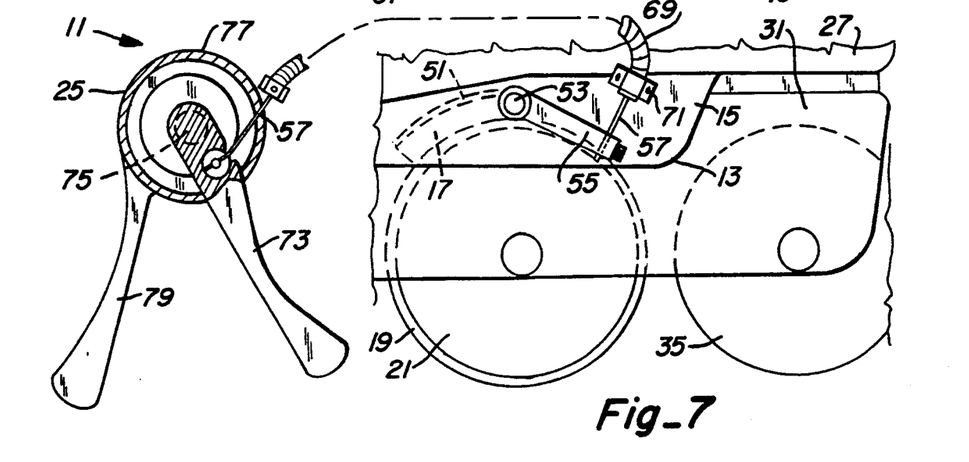
FIG. 7 is an illustration of the braking assembly of this invention including a hand held brake actuator.

As illustrated in FIGS. 3 through 5, with particular reference to selected wheel 21, the wheels are mounted to wheel framework 31 conventionally utilizing axle 41 and bearings 43.

FIG. 2 illustrates a second embodiment 45 of the braking assembly of this invention for application to the rear wheel of a linearly arranged set of wheels. The embodiment illustrated in FIG. 2, however, employs a substantially similar set of components as that illustrated in FIG. 1 and hereinafter described, with the primary distinction being the configuration of mounting plate 47 which is generally required to be directly attached to wheel framework 31.

The overall braking assembly is best illustrated in FIGS. 3 through 7. Relatively resilient band 19 (formed, for example, of any suitable rubber or rubber-like material capable of regaining its shape after compression, stretching or flexion, and having a durometer selected for the load to be born in the particular application, for example a 50 to 65 durometer material for use with skates, depending on weight) is positioned in circumferential groove 49 milled in selected wheel 21 around the entire surface engaging outer circumference thereof. Band 19 has dimensions selected so that when applied to wheel 21 (preferably by stretching the band over the wheel and then into the groove, although gluing, direct molding systems, and the like could be utilized) the diameter of wheel 21 is preferably greater overall than the diameter of the remaining wheels (preferably for example at least by 0.10 inch). Groove 49 is milled to a selected width (preferably corresponding to the width of pad 17) and depth, for example, between 0.10 inch to 0.50 inch deep, and band 49 has an overall width to thereby effect the desired greater diameter (for example, between 0.20 inch and 0.60 inch). It should be realized, that for wheeled apparatus having different load bearing capacities, the size of the groove and band would be adjusted.

It has been found that when applied to skates such as those illustrated in FIGS. 1 and 2, that given an average weight user, a 0.050 compression of the band can be expected between the wheel and the surface over which the skate travels, thereby offering excellent stopping power when light pressure is applied to band 19 by brake pad 17. Since pad 17 and band 19 are both subject to wear, each may be easily replaced in the assembly. Placement of the band and adjacent pad at the middle wheel of a linearly arranged set of wheels in a skate provides excellent control and thus enhanced safety to the user of such skates (such skates being notoriously difficult to stop within a reasonable distance).

Brake pad 17 (formed, for example, from rubber or rubber-like material similar to that used in band 19, asbestos, metal, synthetics and/or alloys known to those skilled in the art) is held (for example by gluing or compression fit) on bracket 51 above wheel 21 and below footwear 27 and support structure 29. Bracket 51 is pivotably mounted at mounting plates 15 on pin 53. Bracket 51 is operatively connected with lever 55 connectable with actuator 25 (for example utilizing mechanical means such as cable 57, although any actuating means, including electronic means, hydraulic means, and the like, could be utilized). Pin 53 has spacers 59 thereover to position bracket 51, and thus pad 17 adjacent to band 19. Bracket 51 is held in contact with pin 53 (for example utilizing set screw 61) for common rotation thereof. Return spring 63 is attached at one end thereof to pin 53 and at the other end thereof at mounting plate 15 to aid return of pin 53, bracket 51 and, thus, pad 17 from a position contacting band 19 upon activation of actuator 25, to a position spaced from band 19 for continued free rotation of wheel 21. Set screw 65 holds lever 55 in contact with pin 53 for common rotation thereof.

Any suitable means for attaching mounting assembly 13 to the wheeled apparatus may be utilized. However, for use with skates of the type shown in FIGS. 1 and 2, it has been found to be especially advantageous to utilize mounting brackets 15 together with pin 53. Such skates typically have a cutaway portion of wheel framework 31 where mounting assembly 13 is shown to be maintained in FIG. 1. Thus, by providing pin head 67 adjacent to one of the plates 15 and spring 63 adjacent to the others of the plates 15, mounting assembly 13 is effectively secured (by clamping) to wheel framework 31 without direct attachment thereto.

Cable 57, in cable jacket 69, is held by bracket 71 attached to mounting plate 15 (for example utilizing screws or the like). The other end of cable 57 is connected with hand held actuator 25 at movable grip 73 rotatably mounted on pin 75 within outer grip assembly 77 including grip 79.

The brake assembly heretofore described may be supplied either as original equipment with the particular wheeled assembly to which it is applied, or may be usefully provided in kit, or other form, for retrofitting to the particular wheeled assembly (the kit optionally including a replacement wheel for selected wheel 21 having band 19 already mounted thereon, or merely including instructions for milling of the selected wheel to accommodate band 19).

Turning now to FIGS. 8 through 12, second embodiment 85 of the brake assembly is shown, as before, mounted to an in-line skate including footwear unit 87, and support structure 89 including a framework, or truck, 91 having a plurality of wheels 93, 95, 97 and 99 mounted thereto on axles 101, 103, 105 and 107, respectively.

Wheel 95 may include the groove and band structure heretofore described, or, may be constructed of material similar to the other wheels, such as urethane, with wheel 95 preferably being more resilient (i.e., having a lesser durometer). In either case, it is preferably for wheel 95 to either have a greater diameter than the other wheels or to be adjustable in truck 91 so that wheel 95 extends below (that is more toward the surface to be engaged by the wheels) the plane defined by the lower surfaces of the other wheels to thus accommodate more responsiveness of the skate to braking.

In the latter case (the case of adjusting the wheel), axle guides 109 are provided in apertures 111 at both sides of truck 91, apertures 111 being elongated, and axle guides 109 having an off center aperture 113 therein. In this fashion, wheel 95 may be adjusted relative to the other wheels by orienting guide 109 in aperture 111 with aperture 113 toward the bottom of the guide relative to the surface over which the skate will move. Guide 109 can be configured to have a plurality of apertures for maintaining axle 103 therethrough, thus refining the ability of a user to determine the relative position of wheel 95 (for example allowing periodic readjustment of the position of the wheel to accommodate for wear of the surface engaging part of wheel 95).

The braking assembly again includes a hand activated actuator 117 (which functions in most regards as the actuator heretofore set forth, but which could be other kinds of actuators such as electronic actuators or actuators activated by other means). The hand held actuator is operatively connected by sheathed cable 119 to actuating lever arm 121 of the braking assembly. The cable sheath is anchored by any conventional mechanism to truck 91 (for example using anchor 123).

Figures 8, 9, 12:
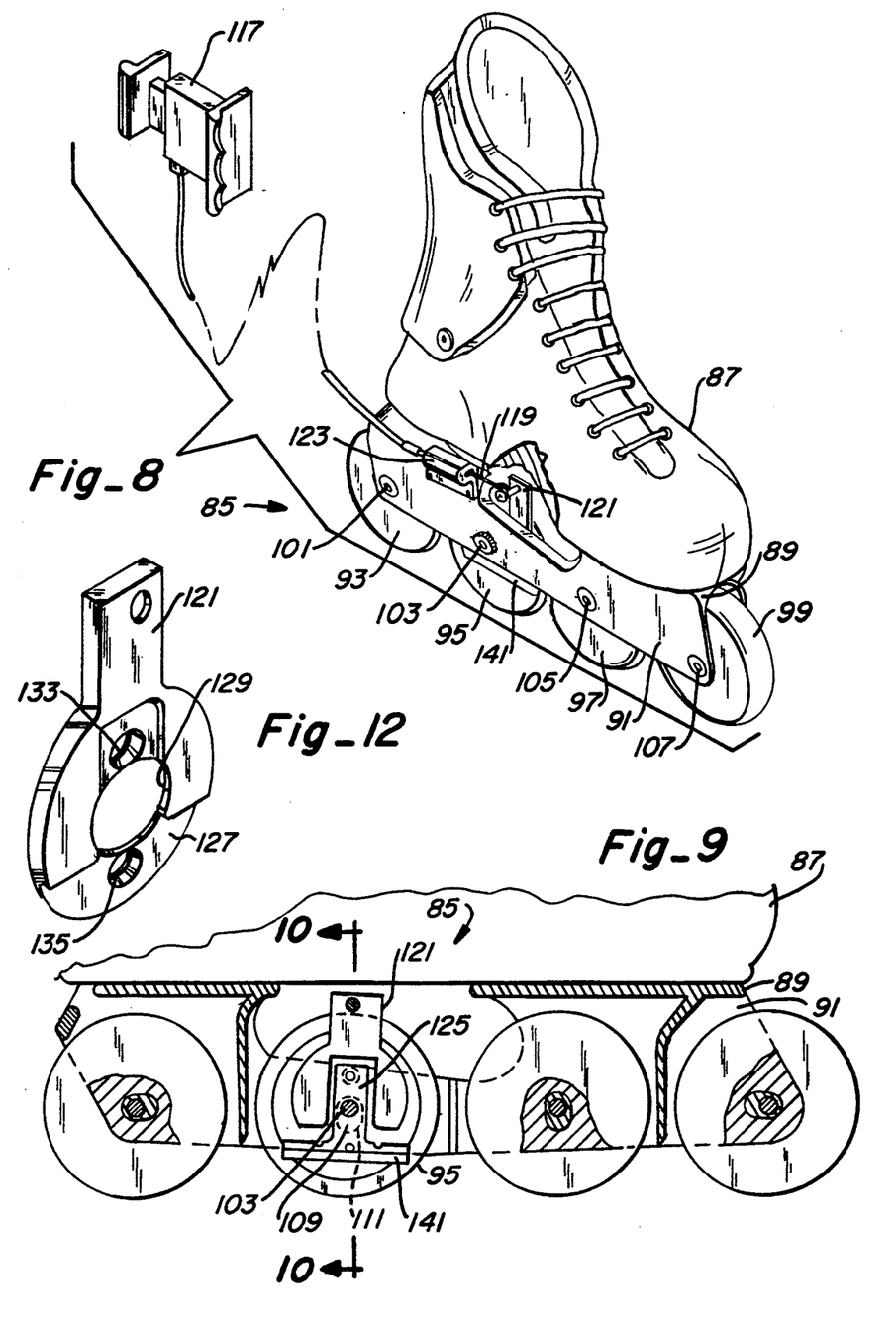
FIG. 8 is a perspective view of a second embodiment of the braking assembly of this invention.
FIG. 9 is a partial side view of the assembly of FIG. 8 with portions cut away.
FIG. 12 is a perspective view of the actuating arm of the assembly.
Figures 10, 11:
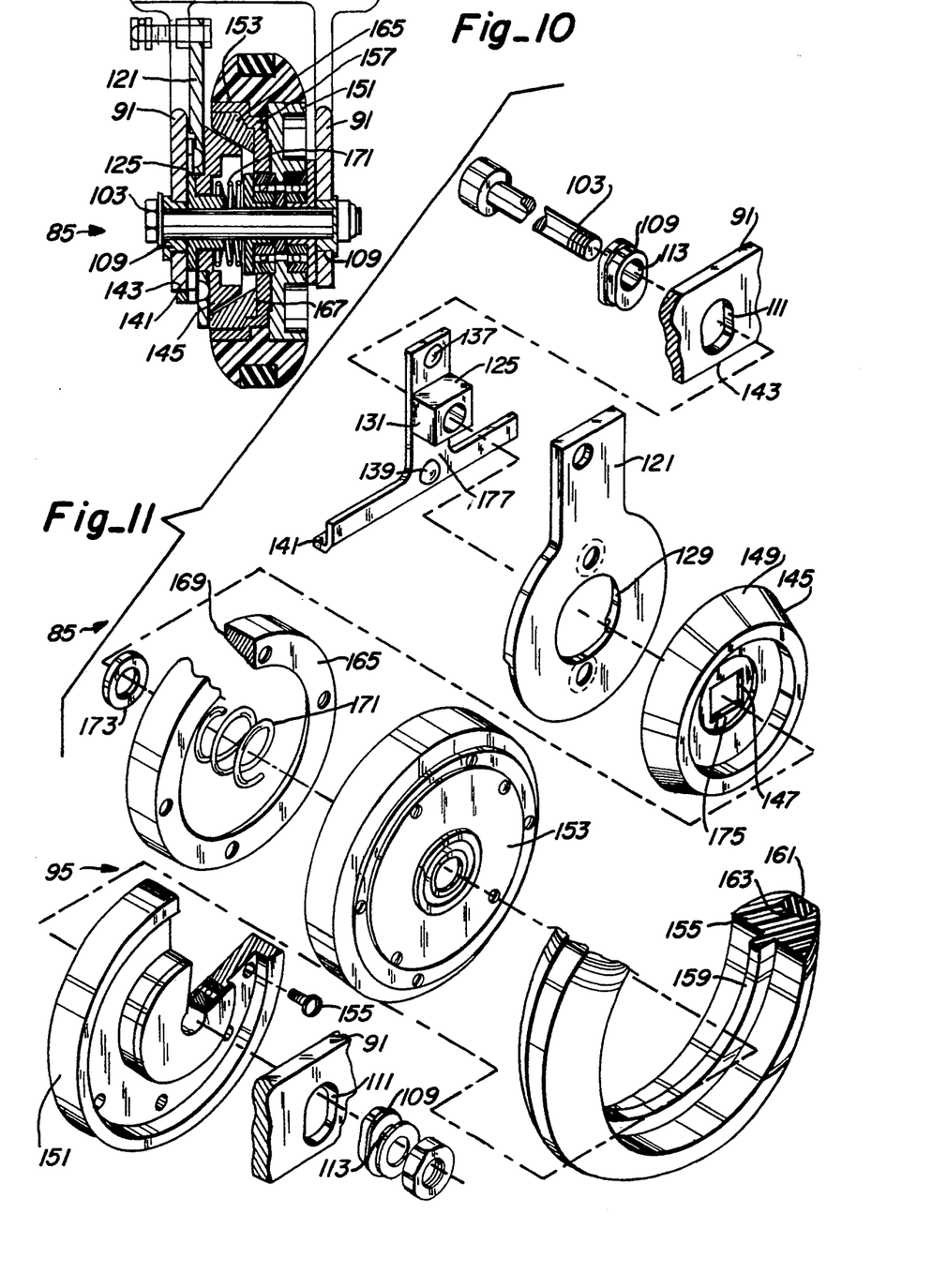
FIG. 10 is a sectional view taken through section line 10—10 of FIG. 9.
FIG. 11 is an exploded view of the braking assembly of FIG. 8.
Figure 13:
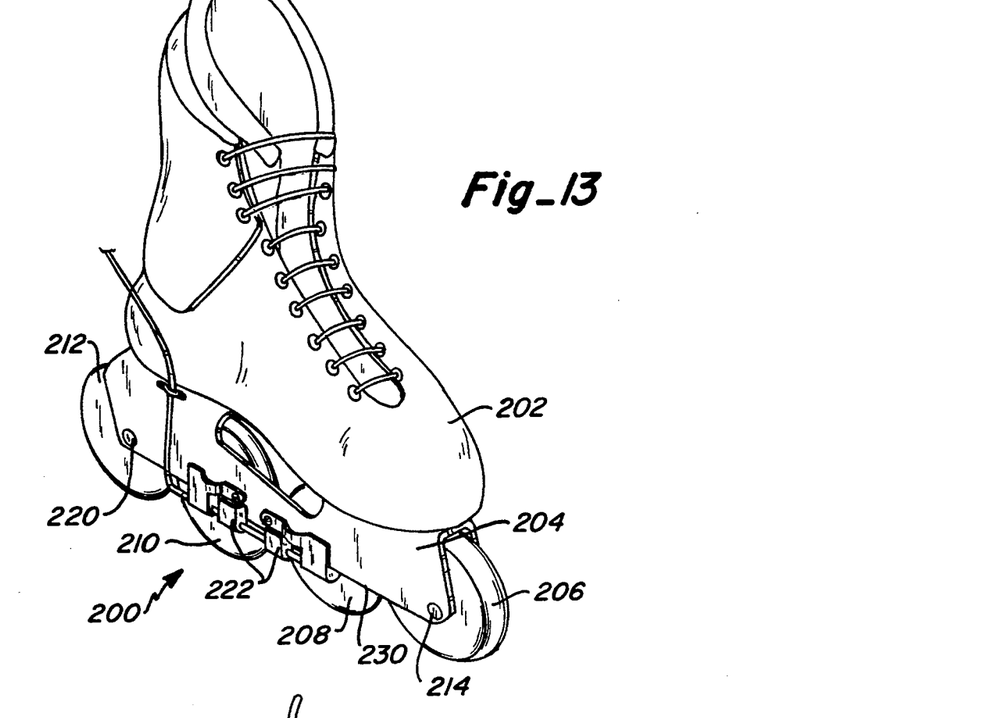
FIG. 13 is a perspective view of a third, and now preferred, embodiment of the braking assembly of this invention mounted on an in-line skate.

Lever arm 121 is maintained around axle 103, with the position thereof being in part established by mount 125. As shown in FIG. 12, lever arm 121 includes an indented face 127, having a shape corresponding to the upper portions of mount 125, and aperture 129 through which axle guide and rotation limiting structure 131 is positioned. Beveled indentations 133 and 135 are formed in face 127, the beveled indentations operating as seats for nodules 137 and 139 of mount 125, with the nodules operating as camming surfaces, as will be set forth hereinafter.

Mount 125 includes lip 141 at the lower portion thereof, lip 141 being maintained adjacent to bottom surface 143 of truck 91, so that, in combination with axle guide structure 131 and axle 103, mount 125 is maintained in a substantially constant position (again without direct attachment thereof to truck 91). Brake pad 145 (preferably formed of a rubber compound, for example typical tire rubber) is movably mounted on rotation limiting structure 131 of mount 125, with brake pad 145 being movable longitudinally along structure 131, but being prevented from rotation by the angular orientation of structure 131 and aperture 147. Braking surface 149 of brake pad 145 is formed by the beveled outer circumference of pad 145 so that surface 149 is oriented neither perpendicular nor parallel to the axis of rotation of wheel 95 (preferably at about a 45° angle relative to the axis rotation).

Wheel 95 is formed by wheel halves 151 and 153 (though unitary construction could be provided) connected, for example, by screws 155. Wheel halves 151 and 153 maintain surface engaging material band 155 in association therewith, with groove 157 defined when the wheel halves are engaged gripping annular ridge 159 of material band 155. In the case illustrated in FIG. 11, an additional material band 161 is provided in groove 163 which functions in the same way as set forth heretofore with respect to band 19.

While not specifically discussed herein, wheel halves 151 and 153 include appropriate bearing surfaces for assuring ease of rotation of wheel 95 on axle 103.

Wheel half 153 has pad engaging structure 165 connected at an inner part 167 thereof, pad engaging structure 165 having braking surface 169 which is matable with braking surface 149 of pad 145, and is thus oriented at a similar angle as surface 149.

By thus orienting the matable, peripheral contact surfaces of pad 145 and pad engaging structure 165, the available braking surface area of each is maximized relative to the space at the inner part of wheel half 153 for providing such braking surfaces.

Engaging structure 165 is connected in wheel half 153, for example by screwing, gluing or the like, and is preferably formed of a linen filled phenolic which provides an excellent braking surface, dissipates heat very quickly, and works well in association with the tire rubber forming brake pad 145.

Biasing spring 171 is maintained between inner part 167 of wheel half 153 and brake pad 145 (adjacent to washer 173 maintained in depression 175 of brake pad 145).

As may be appreciated, the entire assembly can be mounted on an existing in-line skate, or other such wheeled devices or apparatus, with virtually no special preparation of existing apparatus structure.

In operation, actuation of actuator 117 retracts cable 119, thus rotating lever arm 121 about axle 103. As lever arm 121 is rotated, beveled portions 133 and 135 bear against nodules 137 and 139, respectively (only two pair of each being shown, it being understood that other structure could accommodate similar functions with more cam and seat surfaces). Since mount 125 is substantially immovable, the relative movement of faces 127 and 177 of lever arm 121 and mount 125, respectively, and thus of beveled portions 133/135 and nodules 137/139, force lever arm 121 inward and against brake pad 145 thus moving brake pad 145 on structure 131 toward pad engaging structure 165, until braking surfaces 149 and 169 are brought into contact, thus exerting stopping forces on wheel 95. When hand held actuator 175 is released, arm 121 returns to its original position with spring 171 forcing brake pad 145 back to its resting position spaced from structure surface 169, and with nodules 137 and 139 again seated in beveled structures 133 and 135.

A third, and now preferred, embodiment 200 of the braking assembly of this invention is illustrated in FIGS. 13 through 18 mounted to an in-line skate which, as before, includes footwear unit 202, support structure 204, and a single linearly arranged set of wheels 206, 208, 210 and 212 rotatably connected by separate axles 214, 216, 218 and 220 to support structure 204.

Figure 15:
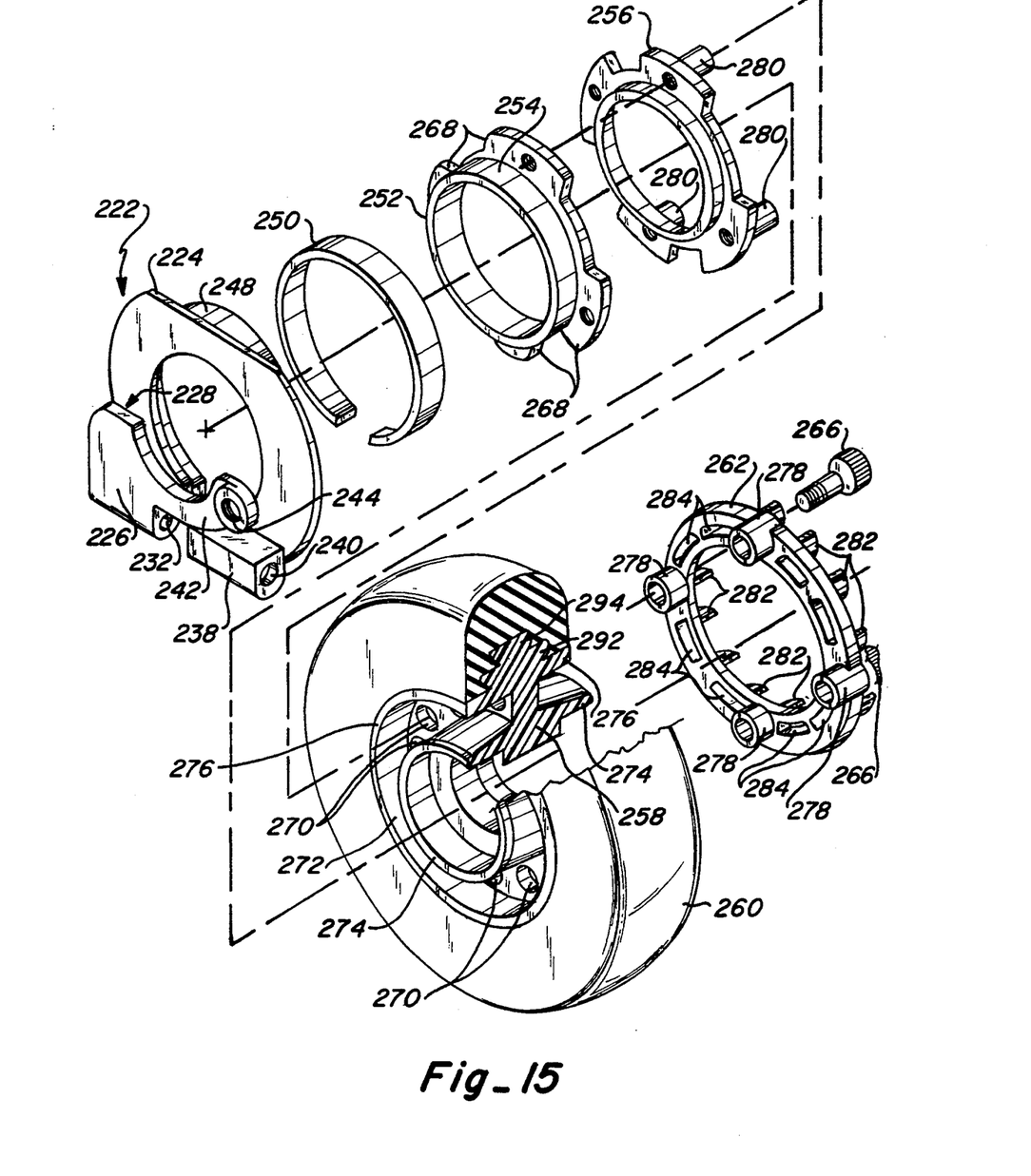
FIG. 15 is an exploded view of the assembly of FIG. 13.
Figure 17:
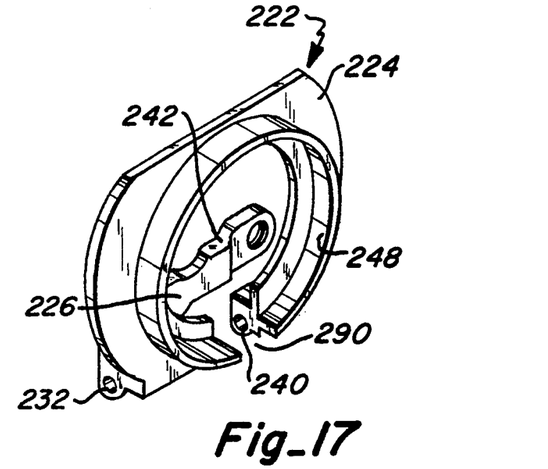
FIG. 17 is a perspective view of the brake pad mounting structure of the assembly of FIG. 13.
Figure 18:
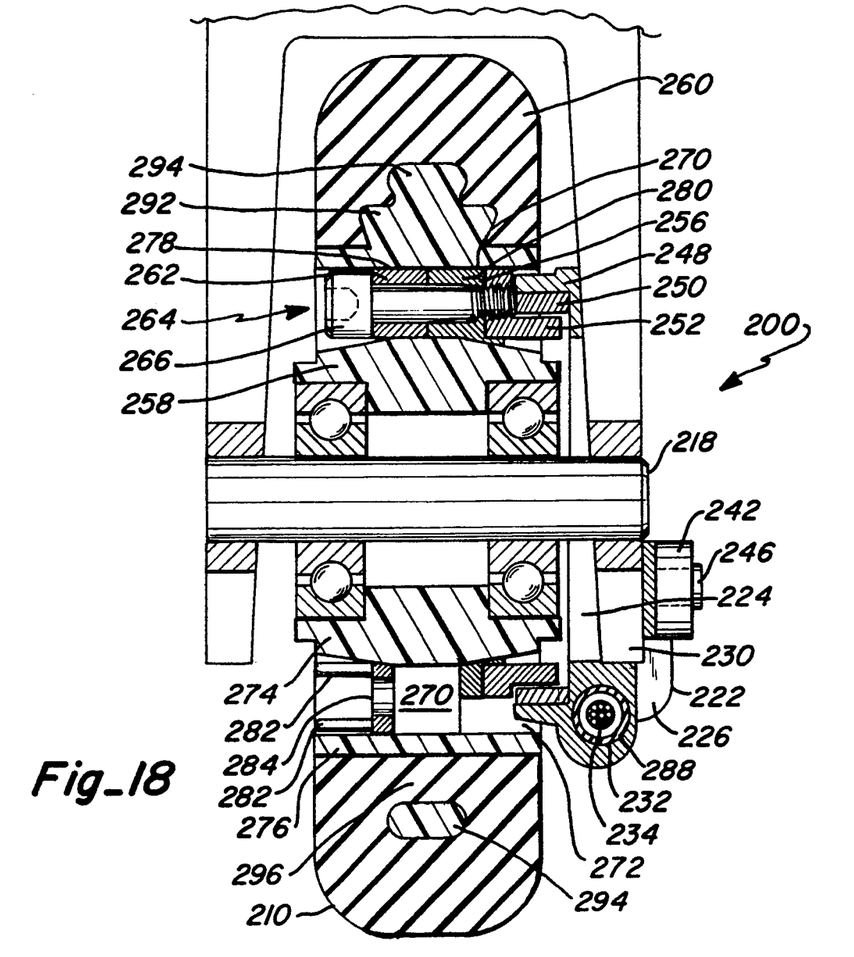
FIG. 18 is a sectional view taken through section lines 18—18 of FIG. 14.

Assembly 200 includes movable brake pad mount 222 (and preferably a plurality thereof, though a single assembly, and thus mount, could be utilized, and particularly where the in-line skate is a three wheel skate) mounted to support structure 204, preferably adjacent to a middle one or ones of the skate wheels. As shown in FIGS. 15, 17 and 18, brake pad mount 222 includes mounting plate portions 224 and 226 defining interstice 228 therebetween for receipt of the lower part of support structure wall 230 therein (the lower edge of the truck).

Adjacent to the bottom of interstice 228, where plate portions 224 and 226 come together, is defined cable passage 232 for receipt therethrough of actuating cable 234 (as discussed heretofore, and connected at the other end thereof with actuating mechanism 236). Structure 238 defining a second cable passage 240 is formed on plate 224. Stabilizing arm 242 extends from plate 226 and has a threaded aperture 244 therein for receipt of set screw 246 (see FIG. 18) therethrough for securement of mount 222 to support structure 204. Annular pad mounting surface 248 extends from plate 224 for receipt of brake pad 250 thereat (utilizing an adhesive or the like).

Figure 14:
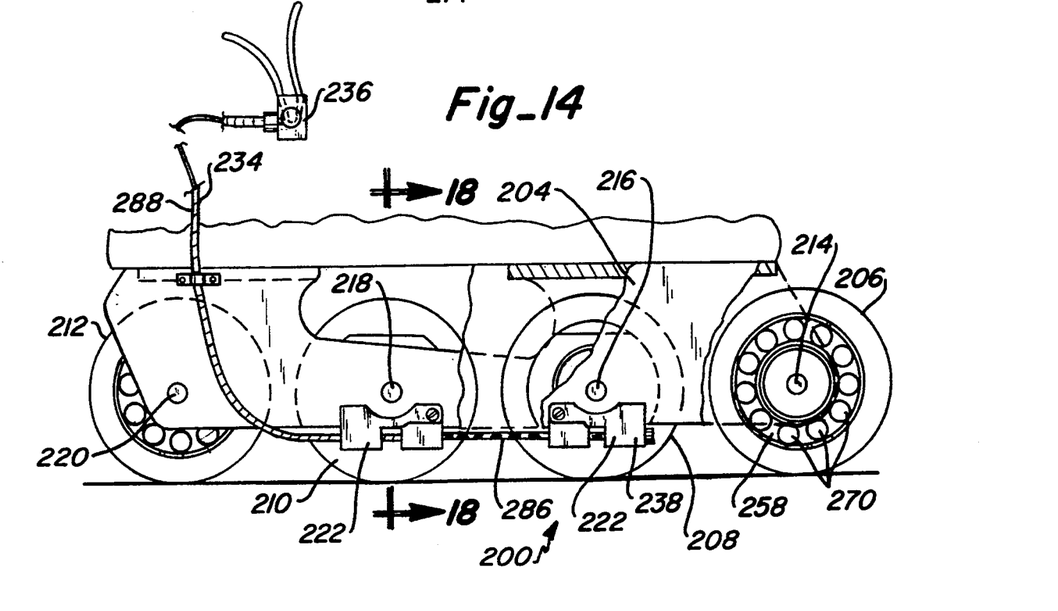
FIG. 14 is a side view having portions broken away of the braking assembly as shown in FIG. 13.

Brake drum 252 having annular braking surface 254, insulator 256, wheel hub, or core, 258 (having tire 260, preferably made of polyurethane, formed thereon), and insulator/heat dissipating mechanism 262 together define hub 264 of the wheel or wheels to which braking is to be applied, and are connected utilizing screws 266 (preferably 4 such screws being provided and threaded into drum ears 268). As shown in FIGS. 14 and 15, core 258 includes a plurality of openings 270 therethrough in annular bore 272 between bearing mounting wall 274 and rim 276. The openings are spaced to receive mounting lugs 278 of insulator/heat dissipating mechanism 262 and lugs 280 of insulator 256 (screws 266 being received through the lugs) in spaced ones thereof, while leaving interspersed ones thereof open for movement of air through the core.

Figure 16:
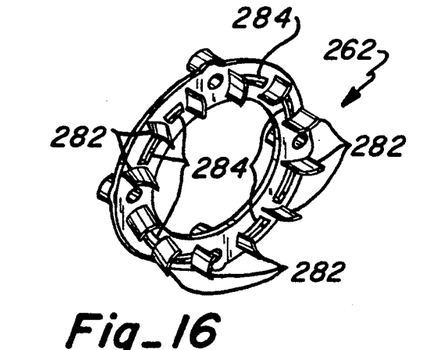
FIG. 16 is a perspective view of an insulating/heat dissipating mechanism of the braking assembly of FIG. 13.

Insulator/heat dissipating mechanism 262 (as shown in FIGS. 15 and 16) includes a plurality of arcuate projections 282 arranged alternately with a plurality of passages 284, the projections being curved and canted so that air is directed through the passages (and thus through the openings in core 258) when the skate is moving forward. In this way a flow of air is provided to dissipate heat built up during braking and/or normal skating activities.

Where dual brakes are utilized, as shown in FIG. 14, rigid, hollow spacer bar 286, having cable 234 running therethrough, is positioned and secured to mounts 222 (although it should be recognized that a single mounting structure could be utilized incorporating dual pad mounting surfaces). Cable 234 is secured at structure 238 of the latter of mounts 222, cable sheath 288 being secured at cable passage 232. When activated, mount or mounts 222 are contracted (at gap 290 in FIG. 17) thus bringing pad or pads 250 into contact with surface 254 of the respective brake drum 252.

As shown in FIGS. 14 and 18, core 258, which may have significant utility aside from use with this invention (as is also true of heat dissipating mechanism 262), includes dual platform ridges 292 and 294 and a plurality of passages 296 arranged radially at an outer circumference of core 258 at platform ridge 292. Use of this structure assures better hold of the polyurethane to the core when cast. Core 258 is preferably made of polycarbonate plastic or the like with a rough, or EDM, finish (at least at rim 276 and ridges 292 and 294) to accommodate better grip between tire 290 and core 258.

Insulators 256 and 262 are preferably made of phenolic, brake drum 252 being cast or molded of grey iron, or the like. Mounts 222 are preferably made of aluminium or other suitable, known, resilient and heat tolerant material.

As may therefore be appreciated, an improved braking assembly and method, marked by compact arrangement and improved stability and response time, is provided for wheeled apparatus including in-line skates.

What is claimed is:

1. A braking assembly for wheeled skating apparatus having a single linearly arranged set of at least three wheels, the set of wheels including at least a first middle wheel, each of the wheels having a central hub with a skating surface engaging unit mounted thereon and being rotatably connected by a separate axle through the hub with a support structure, said braking assembly comprising:

a brake pad mount having an inwardly facing annular surface mountable with the support structure adjacent to the hub of one of the wheels;

a brake pad attached to said annular surface of said brake pad mount;

the hub of said one of the wheels having an annular surface configured to be in proximity to said brake pad when said brake pad mount is mounted; and actuating means operatively associated with said brake pad mount for selectively contracting said brake pad mount so that said brake pad contacts said surface of the hub of said one of the wheels.

2. The assembly of claim 1 wherein the hub of said one of the wheels includes heat dissipating means for inducing air flow to the hub.

3. The assembly of claim 1 wherein said surface is an annular surface defined in an annular bore in the hub of said one of the wheels.

4. The assembly of claim 1 wherein said actuating means includes a hand activated actuator.

5. A braking assembly for an in-line skate having a single linearly arranged set of at least three wheels, the set of wheels including at least a first middle wheel, each of the wheels having a central hub with a skating surface engaging unit mounted thereon and being rotatably connected by a separate axle through the hub with a support structure, said braking assembly comprising:

brake pad means having an inwardly facing annular surface mountable to the support structure adjacent to the hub of at least one of the wheels;

the hub of said at least one of the wheels having an annular bore at a face thereof;

pad contacting structure mounted at said bore so that an annular surface of said pad contacting structure is adjacent to said inwardly facing annular surface of said brake pad means when said brake pad means is mounted; and actuating means operatively associated with said brake pad means for selectively contracting said brake pad means so that said brake pad means contacts said surface of said pad contacting structure.

6. The assembly of claim 5 further comprising:

said brake pad means being mountable to the support structure adjacent to the hub of at least two of the wheels;

the hubs of said at least two of the wheels both having an annular bore at a face thereof; and pad contacting structure mounted at said bores of the hubs of both said at least two of the wheels so that surfaces of said pad contacting structures are in proximity to said brake pad means when said brake pad means is mounted.

7. The assembly of claim 6 wherein said brake pad means includes mounting means and first and second brake pads.

8. The assembly of claim 5 further comprising an insulator mounted between said pad contacting structure and the hub of said at least one of the wheels.

9. The assembly of claim 5 further comprising heat dissipating means mounted with the hub of said at least one of the wheels for inducing air flow toward the hub.

10. The assembly of claim 9 wherein the hub of said at least one of the wheels includes a plurality of openings therethrough to accommodate air flow.

11. The assembly of claim 5 wherein said brake pad means includes an annular mount and a brake pad at said mount.

12. An in-line skate comprising:

a support structure;

a single linearly arranged set of at least three wheels including at least a first middle wheel, each wheel having a central hub with a skating surface engaging unit mounted thereon and being rotatably connected by a separate axle through said hub with said support structure;

a movable mount having an inwardly facing annular surface securable adjacent to said support structure;

a brake pad mounted with said inwardly facing annular surface of said mount and movable therewith;

a pad contacting structure connected to one of said hubs of said wheels; and actuating means operatively associated with said mount for selectively contracting said brake pad mount to cause said brake pad to contact said pad contacting structure.

13. The skate of claim 12 wherein said one of said hubs of said wheels is on said middle wheel.

14. The skate of claim 12 wherein said pad contacting structure is a brake drum mounted in an annular bore in said one of said hubs of said wheels.

15. The skate of claim 12 further comprising a second brake pad mounted with said mount and second pad contacting structure connected to a different one of said hubs of said wheels, said actuating means selectively causing said second brake pad to contact said second contacting structure.

16. A method for providing braking of an in-line skate having a single linearly arranged set of at least three wheels including at least a first middle wheel, each wheel having a central hub with a skating surface enagaging unit mounted thereon and being connected by a separate axle through the hub with a support structure, said method comprising the steps of:

mounting a pad contacting structure having an annular surface to the hub of one of the wheels;

movably maintaining brake pad means having an inwardly facing annular surface adjacent to the support structure so that said inwardly facing annular surface thereof is adjacent to said annular surface of said pad contacting structure; and operatively associating actuating means with said brake pad means for selectively contracting said brake pad means to cause contact between said annular surfaces of said brake pad and said pad contacting structure.

17. The method of claim 16 wherein the step of operatively associating actuating means with said brake pad means includes providing a hand activated actuator.

18. The method of claim 16 wherein said step of mounting a pad contacting structure includes the step of mounting said pad contacting structure in an annular bore in the hub of one of the wheels.

19. The method of claim 16 further comprising providing structure at said hub of one of the wheels for at least one of insulating said hub and dissipating heat by inducing a flow of air.

* * * * *